United States Patent [19]
Kniep

[11] Patent Number: 5,915,713
[45] Date of Patent: Jun. 29, 1999

[54] SEMITRAILER SUPPORT DEVICE FOR A SEMITRAILER TRACTOR

[76] Inventor: Thomas Kniep, Lerchenstrasse 16, 57439 Attendorn, Germany

[21] Appl. No.: 08/794,780

[22] Filed: Feb. 3, 1997

[30] Foreign Application Priority Data

Feb. 21, 1996 [DE] Germany .......................... 196 06 374

[51] Int. Cl.⁶ ........................................................ B62D 53/06
[52] U.S. Cl. .................... 280/441; 280/418.1; 280/438.1
[58] Field of Search ............................. 280/407.1, 418.1, 280/425.1, 423.1, 433, 438.1, 441

[56] References Cited

U.S. PATENT DOCUMENTS

| | | | |
|---|---|---|---|
| 2,978,259 | 4/1961 | Buisson | 280/438.1 |
| 3,360,280 | 12/1967 | Betchart | 280/425.1 |
| 3,552,774 | 1/1971 | Gottler | 280/425.1 |
| 5,004,386 | 4/1991 | Schmidt et al. | 280/438.1 |
| 5,344,173 | 9/1994 | Beeler et al. | 280/438.1 |

FOREIGN PATENT DOCUMENTS

| | | |
|---|---|---|
| 0576722 B1 | 11/1995 | European Pat. Off. . |
| 1755798 | 6/1979 | Germany .............. 280/438.1 |
| 2855750 | 7/1979 | Germany .............. 280/438.1 |

*Primary Examiner*—Daniel G. DePumpo
*Attorney, Agent, or Firm*—William H. Holt

[57] ABSTRACT

A semitrailer support device for supporting the fifth wheel of a semitrailer tractor comprises two sliders arranged for displacement along a guide base. Each of the sliders has a link pivotably connected thereto, the other end of the link being pivoted to the fifth wheel. By displacing one slider relatively to the other slider, the height of the fifth wheel can be changed. By displacing the two sliders in common, the longitudinal position can be changed.

7 Claims, 3 Drawing Sheets

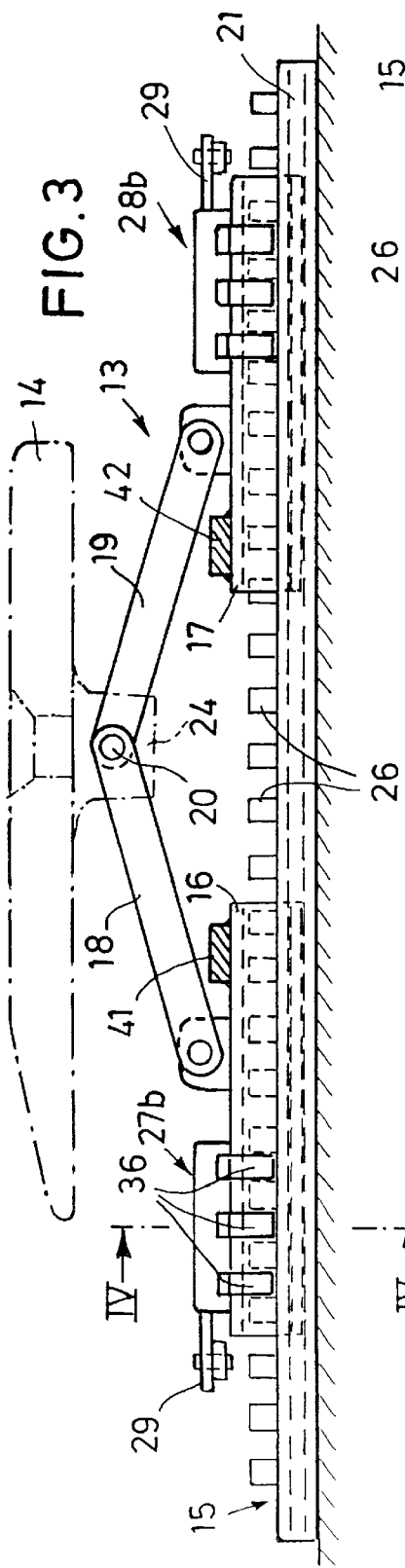
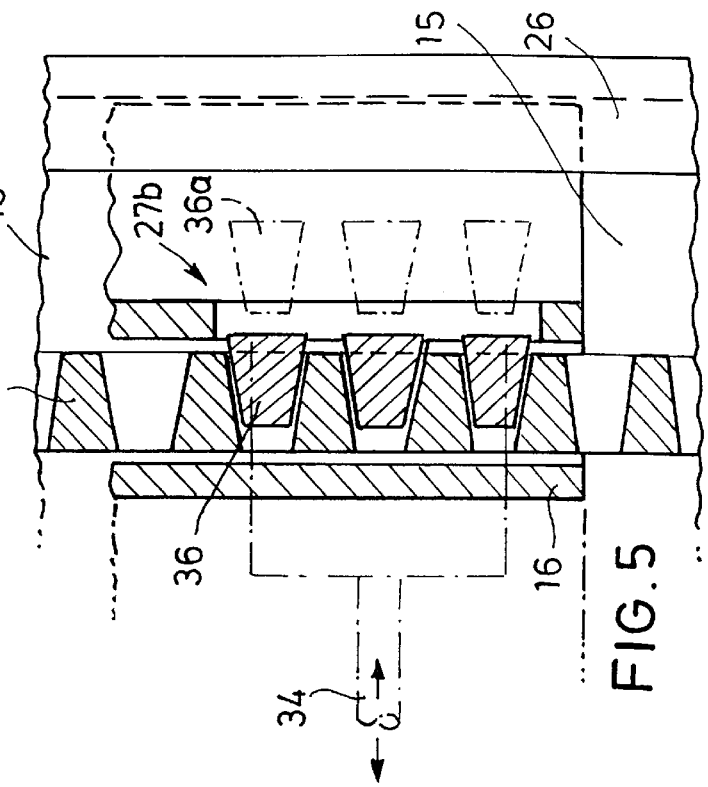
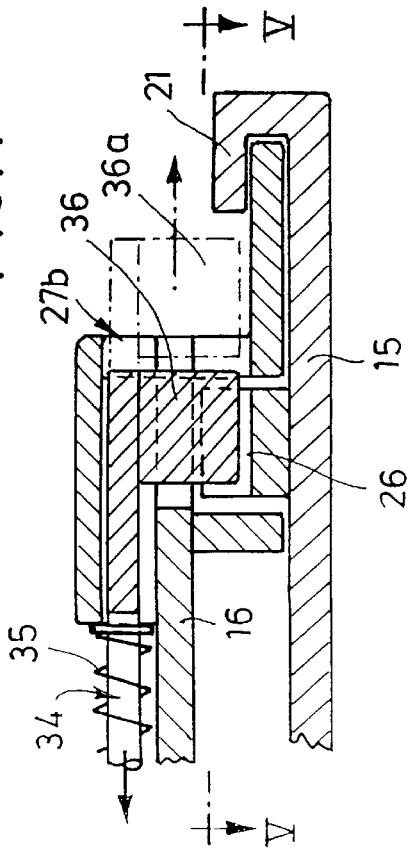

SEMITRAILER SUPPORT DEVICE FOR A SEMITRAILER TRACTOR

The present invention relates to a semitrailer support device for a semitrailer tractor.

BACKGROUND OF THE INVENTION

A device for adjusting the height of the semitrailer support device for a semitrailer tractor is known from European Patent specification 0 576 722 B1. Said device makes it possible to use the semitrailer tractor with semitrailers of different heights. For this purpose, a support plate for attachment of a fifth wheel is mounted above a base plate. The supporting plate can be lifted by a lifting device. In the lifted condition, the support plate can be supported by pivot members which are pivotably connected to the base plate and can be pivoted upwardly.

This device allows only two different height adjustment positions of the fifth wheel.

It is an object of the invention to provide a semitrailer support device which, while being of a simple construction, allows for a large number of different height adjustment positions of the fifth wheel.

SUMMARY OF THE INVENTION

In the semitrailer support device of the invention, a guide base fixedly connected to the vehicle frame of the semitrailer tractor has arranged thereon at least one slider adapted to be displaced in the longitudinal direction of the vehicle and to be locked in different positions. Pivoted to the slider is a link having its other end connected to the fifth wheel. A further link is supported on the guide base (preferably on a second slider). If the first slider is moved in one direction, the angle defined by the links is reduced, and the links are raised together with the fifth wheel. If, however, the first slider is moved in the opposite direction, the angle defined by the links is increased, and the fifth wheel is lowered. In this manner, the height of the fifth wheel can be changed by linear movement of the first slider. Such a height adjustment process can be performed in a virtually stepless manner or in very small steps, depending on whether the locking of the slider along the guide base is possible steplessly or in small increments.

It is often desirable to be able to change the longitudinal position of the fifth wheel. The longitudinal position is the position of the fifth wheel in the longitudinal direction of the semitrailer tractor. If each of the links is pivoted to a slider, it is rendered possible to displace both sliders in common and thus change the longitudinal position while maintaining the set height of the fifth wheel.

The fifth wheel is exposed to the weight of the semitrailer and therefore must be able to withstand high stresses. Suitably, the guide base is provided with two rows of parallel tooth elements, with each slider engaging one row of tooth elements by jaw coupling means. The jaw coupling means transmit the load acting on the link and pass it to the guide base. If each of said jaw coupling means is provided to comprise a plurality of coupling teeth engaging the tooth gaps of the tooth elements, particularly large loads can be taken up.

Preferably, the links comprise plates which extend over a substantial part of the width of the guide base. These plates do not only take up the load of the weight of the fifth wheel but also lateral and torsional forces.

Preferably, the sliders are connected to each other by a length adjustment device which is free of reaction effects. In this manner, the mutual distance of the sliders can be changed and reliably maintained. Even when if both sliders are displaced in common, their mutual distance will remain the same due to the length adjustment device.

A preferred embodiment of the invention will be explained in greater detail hereunder with reference to the accompanying drawings.

BRIEF DESCRIPTION OF THE DRAWINGS

FIG. 3 is a side view of as seen from the direction of the arrows III—III of FIG. 2, FIG. 4 is a vertical sectional view taken along the line IV—IV of FIG. 3, and FIG. 5 is a sectional view taken along the line V—V of FIG. 4.

DETAILED DESCRIPTION OF A PREFERRED EMBODIMENT

Figure 1:
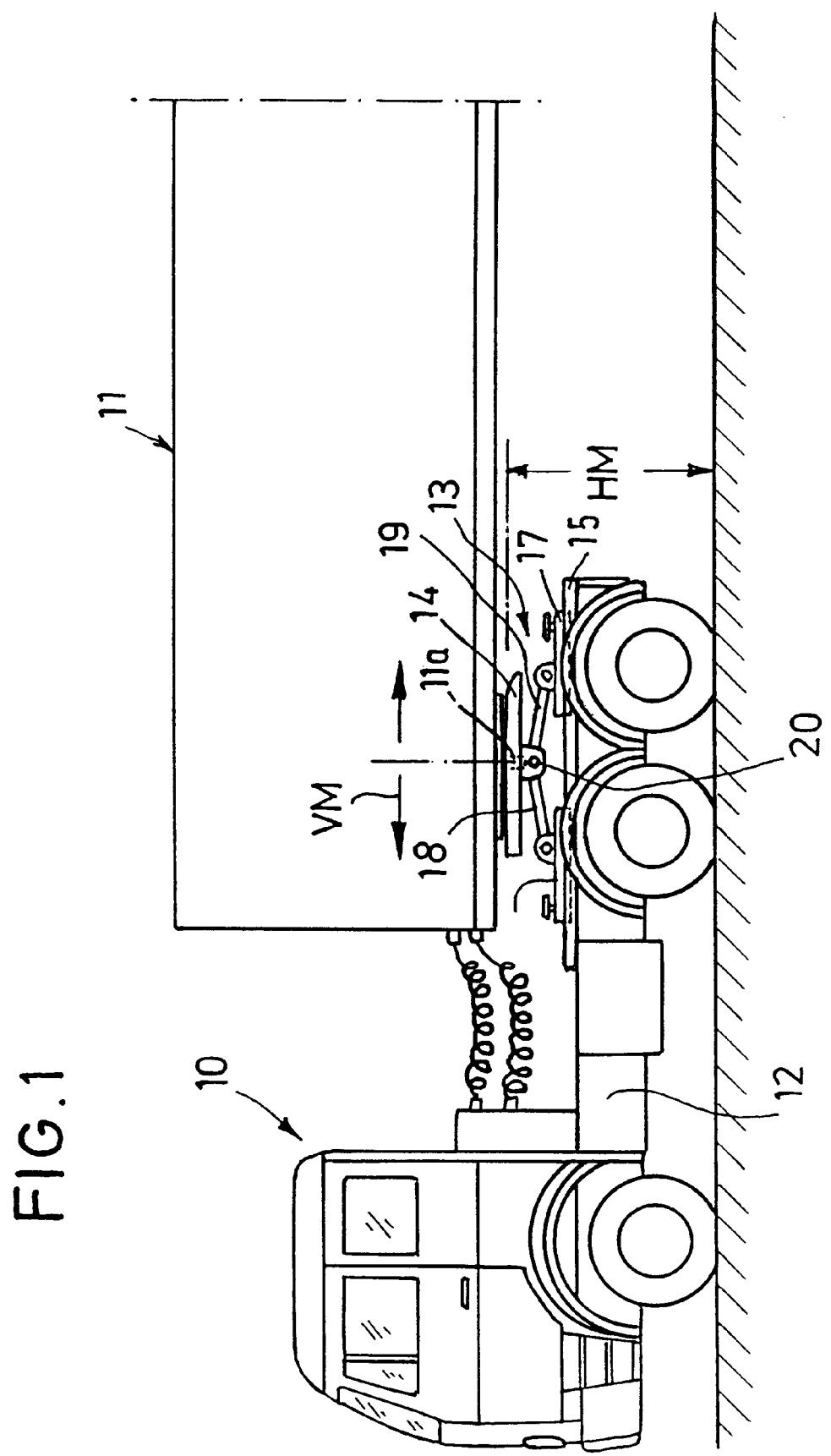
FIG. 1 is a side view of a trailer vehicle wherein the semitrailer tractor is provided with the semitrailer support device of the invention.

FIG. 1 shows a semitrailer tractor 10 combined with an exchangeable semitrailer 11. Semitrailer tractor 10 comprises an independently driven vehicle which on its vehicle frame 12 carries the semitrailer support device 13. Semitrailer support device 13 comprises a fifth wheel 14 provided as a U-shaped disk having the front end of the semitrailer 11 resting thereon. A receiving portion of fifth wheel 14 is provided for engagement by a kingbolt 11a projecting from the bottom of semitrailer 11.

In the semitrailer support device 13 to be explained in greater detail hereunder, it is possible to change the height HM and the longitudinal position VM of the fifth wheel 14 relatively to vehicle frame 12.

A guide base 15, provided as a strong plate, is fixedly mounted to vehicle frame 12. On this guide base 15, two likewise plate-shaped sliders 16,17 are arranged for displacement in the longitudinal direction of the vehicle. Each slider 16,17 is provided with a link 18,19 pivotably connected thereto for pivoting about a horizontal axis extending in the transverse direction of the vehicle. The mutually confronting other ends of the links 18,19 are pivoted along a common axis 20 under fifth wheel 14.

If the slider 17 maintains its position on guide base 15 and only the slider 16 is displaced in the longitudinal direction, the fifth wheel 14 is raised or lowered. If, however, both sliders 16,17 are displaced in common, the fifth wheel 14 maintains its height whereas the longitudinal position VM is changed. The raising and lowering of fifth wheel 14 is performed in the unloaded condition, i.e. in the absence of semitrailer 11. Only when the semitrailer has been raised to the desired height, semitrailer 11 will be placed on it.

Figure 2:
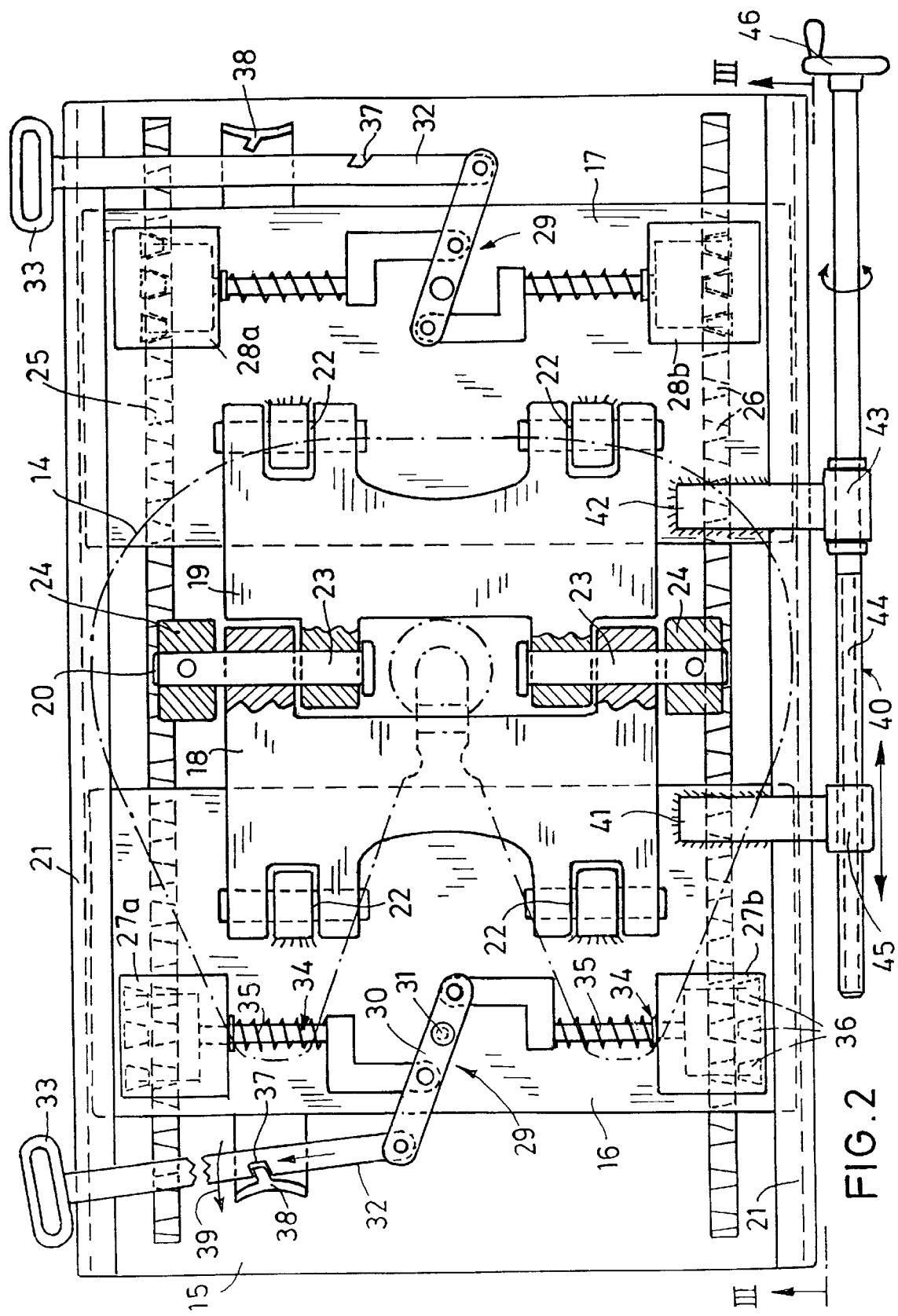
FIG. 2 is a plan view of the semitrailer support device.

FIGS. 2 and 3 illustrate the guide base 15 formed as an elongate rectangular plate to be mounted to the frame 12 of the vehicle. The longitudinal edges of this plate are bent to form lengthwise guide rails 21 wherein the sliders 16,17 are arranged in a displaceable manner. Each slider 16,17 extends along the whole width of guide base 15, with the guide rails 21 gripping over its longitudinal edges. Both sliders 16,17 are guided in a linear direction in a manner allowing only forward and rearward movements.

Each of the link plates 18,19 has its lower end connected to the associated slider 15 and 16, respectively, by joints 22 with horizontal axes. The width of the plates 18,19 in the transverse direction of the vehicle is larger than half the width of the guide base 15. On their upper transverse edges, the plates 18,19 are pivotably connected to each other by pivot pins 23 arranged on the common axis 20. Each of the pivot pins 23 is fastened to a holder 24 projecting downwardly from fifth wheel 14.

Two rows of parallel coupling teeth 25,26 are arranged on guide base 15 in parallel to guide rails 21. Between respectively two coupling teeth 25,26, a tooth gap is formed with a width diverging in outward direction. The coupling teeth 25,26 serve for locking the sliders 16,17. Further, the coupling teeth 25,26 are arranged to cooperate with jaw coupling means 27a,27b and 28a,28b. The jaw coupling means 27a, 27b of slider 16 engage a respective row of teeth 25,26, and the jaw coupling means 28a,28b of slider 17 likewise engage a respective row of teeth. The jaw coupling means 27a,27b are coupled to each other by a lever mechanism 29 comprising a two-armed lever 30 supported at 31 and pivotable manually by operating a rod 32. For this purpose, rod 32 is provided with a handle 33. The two arms of lever 30 are pivoted to actuating members 34 which are respectively guided for displacement in the transverse direction of the vehicle. Each actuating member 34 is supported on slider 16 via a spring 35 and connected to jaw coupling means 27a and 27b, respectively. Each jaw coupling means comprises a plurality (in the illustrated case, three) of wedge-shaped coupling teeth 36 adapted for mating engagement with the tooth gaps of the rows of teeth 25,26. The springs 35 maintain the jaw coupling means 27a,27b in the engaged condition (locking condition). By pulling the rod 32, the coupling teeth 36 are brought into the released condition 36a (FIG. 4) while the springs 35 are tensioned. In this condition, the two jaw coupling means 27a,27b, which are synchronized with each other, are in their uncoupled state, and the slider 16 can be displaced in the longitudinal direction.

For locking the jaw coupling means in the disengaged condition, a locking means 37 is provided on rod 32. When rod 32 is manually pivoted into the locking condition (arrow 39 in FIG. 2), locking means 37 will engage a holder 38 of slider 16.

The jaw coupling means 28a,28b of slider 17 are arranged in the same manner as the jaw coupling means 27a,27b of slider 16. By pulling the rod 32, the two appertaining jaw coupling means are uncoupled. This uncoupled condition is maintained by the locking means 37 cooperating with holder 38 so that the operator will now be able to freely use both hands for displacing the slider. By a slight pivoting movement of rod 32, the locking will be released and the coupling teeth 36 will snap into the respective row of teeth 25,26 by the action of the spring 35.

The two sliders 16,17 are connected to each other by a longitudinal displacement means 40. Longitudinal displacement means 40 comprises two holders 41,42 laterally projecting from sliders 16,17. Holder 42 carries a rotational bearing 43 axially supporting a threaded rod 44 in a rotatable manner. The other holder 41 carries a spindle nut 45 engaged by the threads of threaded rod 44. By turning a handwheel 46, the threaded rod 44 is rotated, thus moving the spindle nut 45 in axial direction. As a result, slider 16 is displaced relatively to slider 17 so that the mutual distance of the two sliders is changed. As an alternative to the above spindle drive, the longitudinal displacement means 40 can be provided with a different drive means, e.g. a rack-and-pinion drive.

When intending to change the height adjustment HM (FIG. 1), the semitrailer support device 13 is freed from the semitrailer 11. Then, the jaw coupling means 27a,27b of slider 16 are disengaged while the jaw coupling means 28a,28b of slider 17 will remain in their engaged condition. Subsequently, the longitudinal displacement means 40 can be actuated to horizontally move the slider 16 relatively to slider 17. In this manner, the height of the fifth wheel 14 is changed. In their provided final position, the jaw coupling means 27a,27b will be locked again, which is effected by release of rod 32, so that now both sliders will be in their fixed positions on guide base 15.

If the longitudinal position VM is to be changed, the jaw coupling means of both sliders 16,17 are released, which can be performed in the mounted condition of semitrailer 11. Then, the semitrailer tractor 10 is driven a short distance in the forward or rearward direction while semitrailer 11 remains in its position. In the process, the sliders 16,17 are displaced along the guide rails 21 while maintaining their mutual distance. Thereafter, all jaw coupling means will be locked again, thus fixing the sliders on the guide base.

Although a preferred embodiment of the invention has been specifically illustrated and described herein, it is to be understood that various variations and modifications may be made in the described device without departing from the spirit and the scope of the invention as defined in the appended claims.

I claim:

1. A semitrailer support device for a semitrailer tractor (10), comprising a first slider (16), a guide base (15) for displacing said first slider (16) in the longitudinal direction of said guide base and locking said slider (16) in different positions thereon, a set of two links (18,19) and a fifth wheel (14) engaged by said two links (18,19), one (18) of said links (18,19) being connected to said first slider (16) and the other link (19) being supported on said guide base (15), whereby the height (HM) of said fifth wheel (14) can be changed by displacing said first slider (16); a second slider (17), wherein said second link (19) is pivoted to said second slider (17), said second slider being displaceable together with said first slider (16) in the longitudinal direction of the guide base (15) for changing the longitudinal position (VM) of said fifth wheel (14); two rows of parallel tooth elements (25,26) provided on said guide base (15), and wherein each of said first and second sliders (16,17) comprises two jaw coupling means (27a,27b; 28a,28b) coupled to each other and cooperating with said tooth elements (25,26).

2. The semitrailer support device according to claim 1, wherein each jaw coupling means (27a, 27b;28a,28b) comprises a plurality of coupling teeth (36) engaging the tooth gaps of the tooth elements (25,26).

3. The semitrailer support device according to claim 1 wherein said jaw coupling means (27a, 27b; 28a, 28b) are biased into the locking condition and include means for locking said jaw coupling means in their released condition.

4. The semitrailer support device according to claim 1, wherein said links (18,19) comprise plates which have their one edge pivotably connected to a respective slider (16,17) and have their opposite edge pivotably connected to the fifth wheel (14).

5. The semitrailer support device according to claim 1, wherein said links (18,19) engage said fifth wheel (14) along a common pivot axis (20).

6. The semitrailer support device according to claim 1, wherein said sliders (16,17) are connected to each other by a means (40) provided for longitudinal displacement of the sliders (16,17).

7. The semitrailer support device according to claim 1, wherein the sliders (16,17) comprise plates guided between longitudinal guide rails (21) of said guide base (15).

* * * * *